US012600222B2

(12) United States Patent
Botto et al.

(10) Patent No.: US 12,600,222 B2
(45) Date of Patent: Apr. 14, 2026

(54) ELECTRIC TRANSFER CASE WITH ACTIVE HYBRID ENGAGEMENT

(71) Applicant: Magna Powertrain of America, Inc., Troy, MI (US)

(72) Inventors: Douglas Botto, Royal Oak, MI (US); Jeffrey Botticello, Clawson, MI (US); Jeremy Bakker, LaSalle (CA); Lee McCay, Windsor (CA); Shawn Donaldson, Waterford, MI (US); Devin Ryman, Macomb, MI (US)

(73) Assignee: Magna Powertrain of America, Inc.

( * ) Notice: Subject to any disclaimer, the term of this patent is extended or adjusted under 35 U.S.C. 154(b) by 0 days.

(21) Appl. No.: 19/230,375

(22) Filed: Jun. 6, 2025

(65) Prior Publication Data

US 2025/0376017 A1      Dec. 11, 2025

Related U.S. Application Data

(60) Provisional application No. 63/656,644, filed on Jun. 6, 2024.

(51) Int. Cl.
| | |
|---|---|
| *B60K 6/52* | (2007.10) |
| *B60K 6/365* | (2007.10) |
| *B60K 23/08* | (2006.01) |
| *F16H 57/02* | (2012.01) |

(52) U.S. Cl.
CPC ................ *B60K 6/365* (2013.01); *B60K 6/52* (2013.01); *B60K 23/0808* (2013.01); *F16H 57/02* (2013.01); *F16H 2057/02052* (2013.01)

(58) Field of Classification Search
CPC .. B60K 17/356; B60K 23/0808; B60K 23/08; B60K 6/52; B60K 17/34; B60K 17/344
See application file for complete search history.

(56) References Cited

U.S. PATENT DOCUMENTS

| | | | | |
|---|---|---|---|---|
| 5,649,459 A * | 7/1997 | Murakami | ........... | B60K 17/342 |
| | | | | 74/665 GE |
| 5,884,526 A * | 3/1999 | Fogelberg | ............ | B60K 17/344 |
| | | | | 74/89.17 |
| 6,997,299 B2 * | 2/2006 | Brissenden | .......... | B60K 17/344 |
| | | | | 192/48.601 |
| 7,455,135 B2 * | 11/2008 | Janson | ..................... | B60K 6/48 |
| | | | | 180/65.6 |
| 7,462,121 B2 * | 12/2008 | Janson | ................... | B60K 6/387 |
| | | | | 903/910 |
| 8,622,164 B2 * | 1/2014 | Takaira | .................. | B60K 23/08 |
| | | | | 180/246 |

(Continued)

*Primary Examiner* — Sherry L Estremsky
(74) *Attorney, Agent, or Firm* — Dickinson Wright PLLC

(57) ABSTRACT

An electrified transfer case for a vehicle having an engine, a transmission, and front and rear drivelines is provided. The electrified transfer case includes a first output shaft adapted for connection to the rear driveline, a second output shaft adapted for connection to the front driveline, and an input shaft connected to the output of the transmission. The transfer case may further include a gear set engaged to an electric motor for torque multiplication, a multi-position torque transferring mode connection system, and a controllable torque transfer system between the first output shaft and the second output shaft. A synchronizing device is operatively connected between the input and first output shaft, which may utilize a one-way clutch.

20 Claims, 12 Drawing Sheets

(56)     References Cited

U.S. PATENT DOCUMENTS

| 8,888,638 | B2 | 11/2014 | Mueller et al. | |
| 11,524,566 | B2 * | 12/2022 | Pritchard | F16H 63/3425 |
| 2022/0281308 | A1 * | 9/2022 | Guo | B60K 17/344 |

* cited by examiner

ELECTRIC TRANSFER CASE WITH ACTIVE HYBRID ENGAGEMENT

CROSS-REFERENCE TO RELATED APPLICATIONS

This application claims the benefit of U.S. Provisional Patent Application No. 63/656,644, filed Jun. 6, 2024, the entire content of which is hereby incorporated by reference in its entirety.

FIELD

The present disclosure relates to a hybrid vehicle utilizing an electrified transfer case to selectively distribute power, provided by an internal combustion engine and/or the electric motor included in the electrified transfer case, to a primary and secondary driveline.

BACKGROUND

This section provides background information related to the present disclosure which is not necessarily prior art. Automobile manufacturers are actively working to develop alternative powertrain systems in an effort to reduce the level of pollutants exhausted into the air by conventional powertrains equipped with internal combustion engines. Hybrid vehicles are equipped with an internal combustion engine and an electric motor that can be operated independently or in combination to drive the vehicle. Significant development has been directed to these hybrid electric vehicles, but often requiring a significant modification to the existing powertrain. Hybrid vehicles have been adapted to be used in all-wheel drive or four-wheel drive vehicles with most systems on the market being a P2 hybrid arrangement, where an electric motor is located between the internal combustion engine and a multi gear transmission in a longitudinal arrangement. A transfer case is located at the rear of the transmission to direct power to a primary rear axle and a secondary front axle. Other alternatives include integrating a single motor or dual motors into a multispeed transmission and retaining the standard transfer case to split power between the primary and secondary axle. Implementing a P2 hybrid system with an existing transmission or developing a new hybrid transmission, and combining with a traditional four-wheel drive system, may be extremely expensive and difficult to package due to additional length. Thus, a need exists to develop hybrid powertrains for use in four-wheel drive vehicles that utilize various conventional powertrain components so as to minimize specialized packaging and reduce cost.

SUMMARY

This section provides a general summary of the many aspects associated with the inventive concepts embodied in the teachings of the present disclosure and is not intended to be considered a complete listing of its full scope of protection nor all of its features and advantages.

The electrified transfer case of the present disclosure provides multiple modes and transitions dependent on the operational state of shiftable sleeves, a synchronization member, and a controllable clutch in a layshaft or a planetary gear reduction configuration. Modes include providing a power split to a front and/or rear axle with propulsion from a single or combined power source, as well as a mode to allow the vehicle to be flat towed. The synchronization member may be a one-way clutch to be utilized when transitioning from electric only to hybrid powered modes.

As will be shown, the electrified transfer case also provides additional operating modes not available in conventional hybrid powertrains.

In one form, an electrified transfer case for a vehicle having an engine, a transmission, and front and rear drivelines is provided. The electrified transfer case includes a first output shaft adapted for connection to the rear driveline, a second output shaft adapted for connection to the front driveline, and an input shaft connected to the output of the transmission. The transfer case may further include a gear set engaged to an electric motor for torque multiplication, a multi-position torque transferring mode connection system, and a controllable torque transfer system between the first output shaft and the second output shaft. A synchronizing device is provided, operatively connected between the input and first output shaft, which may utilize a one-way clutch.

The gear reduction set driven by the electric motor may be a planetary or layshaft arrangement. The torque transfer system may be a chain or gear drive, with a controllable multiplate clutch to selectively provide power to the second output shaft and front driveline. The electrified transfer case provides four primary modes. These modes include an electrical only driven mode, an internal combustion engine mode, a hybrid mode, and a neutral flat tow mode with no connection between the input of the electrified transfer case to the front and rear output shafts. Further secondary modes are achieved via actuation of a controllable clutch to provide torque distribution between the front and rear axles to provide a 2WD, an AWD variable mode, or a locked clutch 4WD mode, or controlling the electric motor to provide regeneration to a battery.

In another form, a hybrid vehicle is provided. The hybrid vehicle may include a powertrain, first and second drivelines, and an electrified transfer case. The powertrain may include an internal combustion engine and an electric motor as motive power sources. The first driveline may transfer power to a first set of ground engaging wheels. The second driveline may transfer power to a second set of ground engaging wheels. The electrified transfer case may include first and second output shafts and an input shaft. The first output shaft may be adapted for connection to the first driveline and the second output shaft may be adapted for connection to the second driveline. The input shaft may be adapted for connection to the output of a transmission powered by an internal combustion engine. The electrified transfer case is provided as described above and provides the ability for the hybrid vehicle to operate in the various modes depending on the position of the mode selection device and the controllable clutch assembly.

These and other features and advantages of the present disclosure will become more readily appreciated when considered in connection with the following detailed description and drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DETAILED DESCRIPTION

The following description is exemplary in nature and is not intended to limit the present disclosure, application, or uses.

Figure 1:
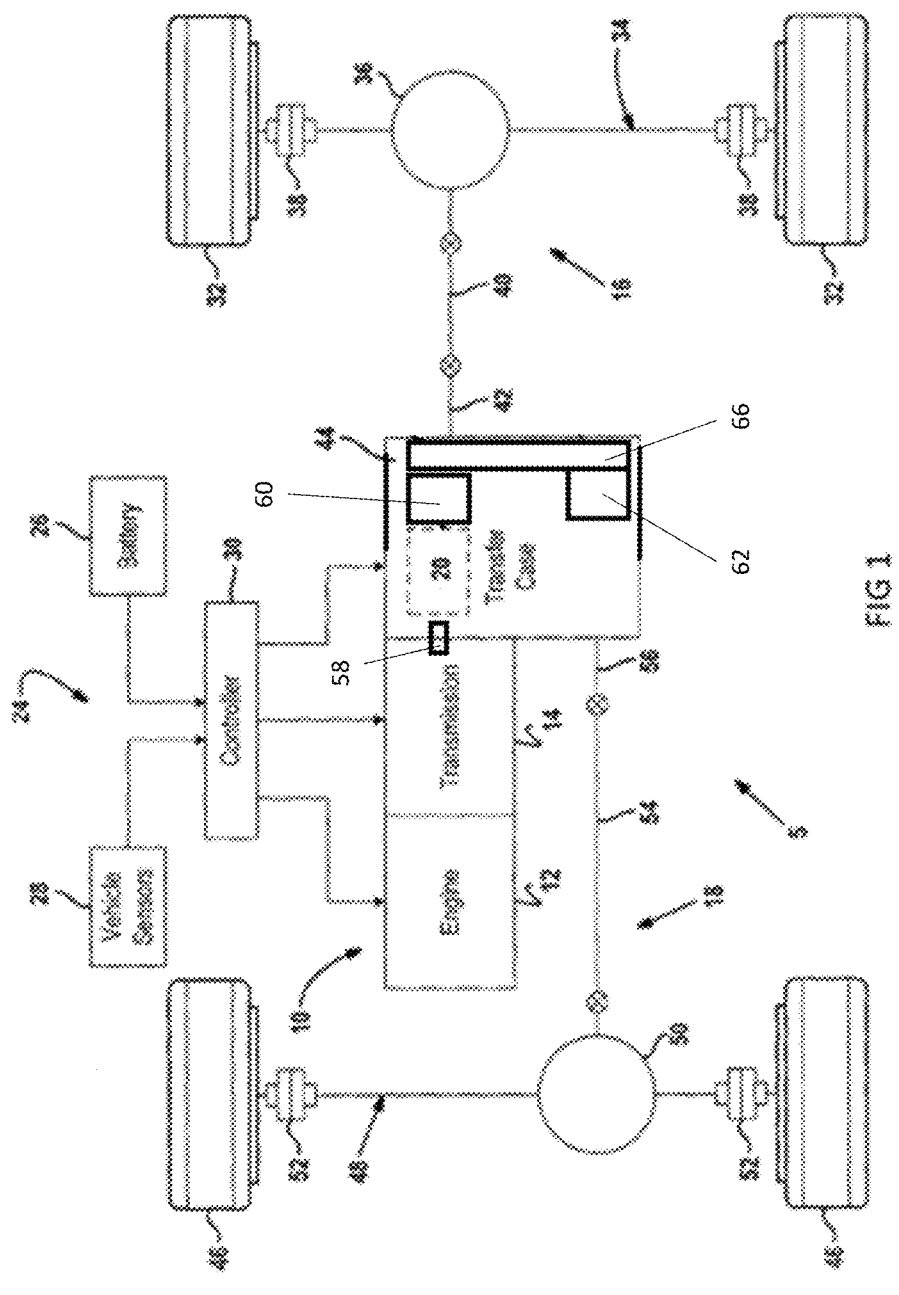
FIG. 1 is a schematic of a hybrid drive system for a four-wheel drive vehicle in accordance with the teachings of the present disclosure.

Referring to FIG. 1 of the drawings, a hybrid powertrain system 5 for a hybrid motor vehicle is shown and includes a first power source 10, a transmission 14, a rear driveline 16, a front driveline 18, and a second power source 20. The first power source may be an internal combustion engine 12 and the second power source may be an electric motor/generator 22. Transmission 14 can be of any known type including, but not limited to, an automatic, manual, automated manual, or continuously variable transmission. The vehicle may further include a powertrain control system 24 generally shown to include a battery 26, a group of vehicle sensors 28, and a controller 30. Rear driveline 16 may include a first pair of wheels 32 connected to a rear axle assembly 34 having a differential unit 36 and a pair of rear axle or wheel disconnects 38. Differential unit 36 may be connected to one end of a rear prop shaft 40, the opposite end of which can be connected to a first or rear output shaft 42 of a transfer case 44. Similarly, front driveline 18 may include a second pair of wheels 46 connected to a front axle assembly 48 having a differential unit 50 and a pair of wheel disconnects 52. Alternatively, a center axle disconnect may be provided in place of wheel disconnects 38 and 52 to achieve similar functionality. Differential unit 50 may be connected to one end of a front prop shaft 54, the opposite end of which may be connected to a second or front output shaft 56 of electrified transfer case 44.

The hybrid four-wheel drive powertrain system 5 of the present disclosure may include two main power sources, namely the internal combustion engine 12 and the electric motor/generator 22. Power from engine 12 may be transmitted to transmission 14, which in turn may be delivered to transfer case 44 via input shaft 58. Control system 24 may be provided for controlling operation of the hybrid four-wheel drive powertrain system 5. Based upon the operating information inputted to controller 30, a mode of operation of the electrified transfer case 44 may be selected and controller 30 can send electronic control signals to the various power-operated controlled devices. Specifically, controller 30 may monitor and continuously control actuation of motor/generator 22, engagement of front and rear wheel disconnects 52, 38 if present, operation of mode selector 60, and operation of controllable clutch assembly 62.

Figure 2:
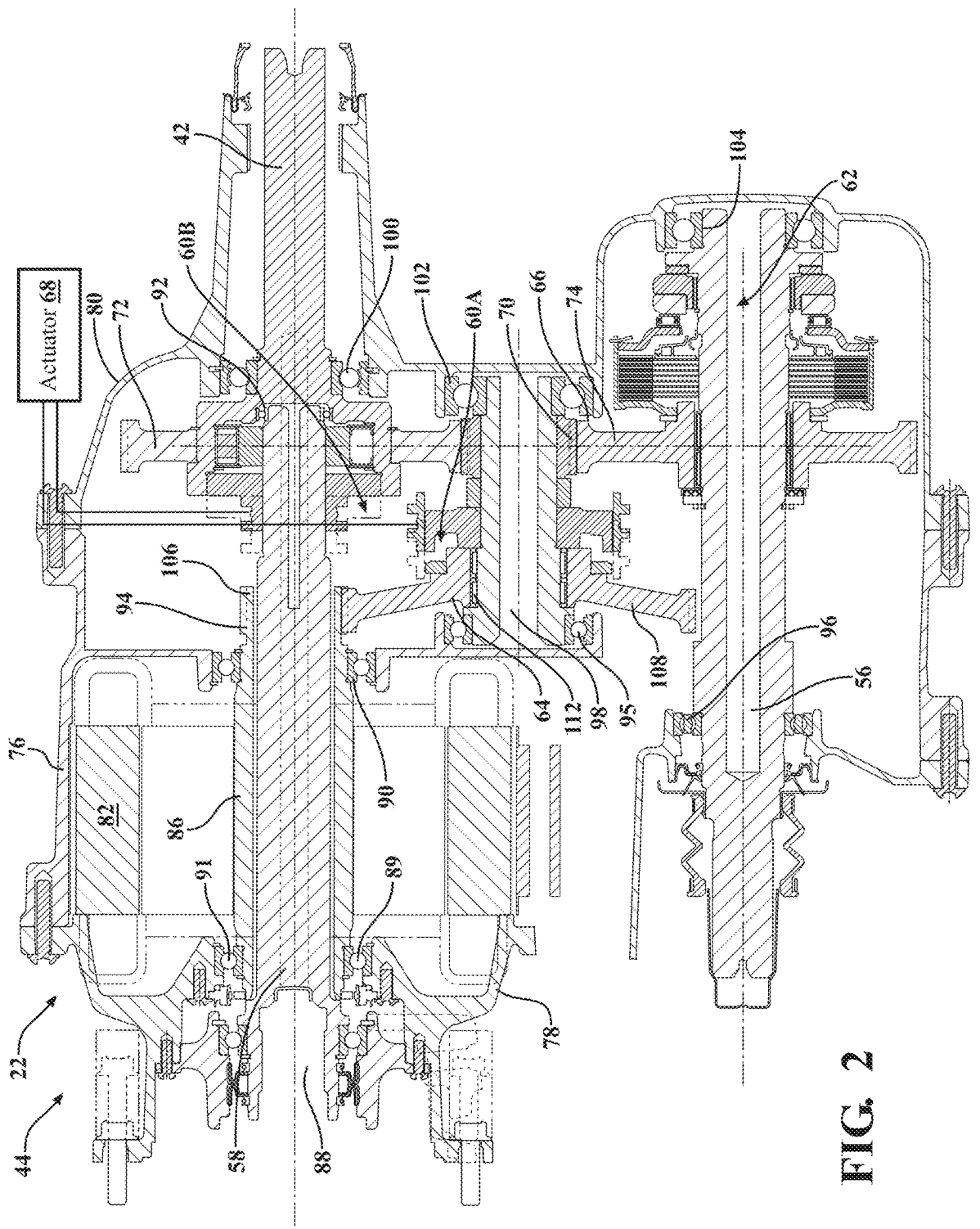
FIG. 2 is a cross-section of a first embodiment of an electrified transfer case of the present disclosure.

Referring now to FIG. 2, a first arrangement of electrified transfer case 44 is shown including an electric motor 22, and a gear reduction assembly 64 in the form of a layshaft arrangement that multiples torque from electric motor 22 to a power transferring device 66, depending on the state of a mode selector 60. Mode selector 60 in this first arrangement will include a layshaft mode selector 60A located on the layshaft axis L and a mainshaft mode selector 60B located on the same axis as the input shaft 58 and rear output shaft 42. The layshaft mode selector 60A and mainshaft mode selector 60B may be shifted via an actuator 68. Actuator 68 may be a single actuator or multiple actuators of electromechanical, electromagnetic or other type capable of moving mode selectors 60A and 60B in a controlled manner through the required axial positions based on commands from controller 38. Depending on the mode selected, power is selectively provided to rear output shaft 42 and/or front output shaft 56 via different power paths. Power from electric motor 22 is selectively provided via layshaft gear reduction assembly 64 to power transferring device 66 via layshaft mode selector 60A, while power from engine 12 via transmission 14 is selectively provided to power transferring device 66 via the selectable connection by mainshaft mode selector 60B between input shaft 58 and rear output shaft 42. Power transfer device 66 includes an arrangement of meshed parallel axis gears including an idler gear 70, a rear output gear 72 concentric with rear output shaft 42, and a front output gear 74 concentric with the front output shaft 56. Idler gear 70 is located on layshaft axis L and is axially offset and located radially between the rear output shaft 42 axis and the front output shaft 56 axis. The utilization of this arrangement for power transfer device 66 is beneficial because it reduces axial space by utilizing the idler gear 70 as a power input when electric motor 22 is connected in electric or hybrid mode, while also utilizing idler gear 70 to transfer power from rear output gear 72 to front output gear 74 when in traditional ICE driven or hybrid mode.

Electrified transfer case 44 includes a middle housing 76 which receives an electric motor 22. A front housing 78 is provided to close a first front side of middle housing 76 while a rear housing 80 is provided to close a second rear side of middle housing 76. Electric motor 22 includes a stator 82 fixed to the middle housing 76. A rotor assembly 84 of electric motor 22 is located radially inward from stator 82 and includes a hollow rotor shaft 86. Rotor shaft 86 is supported via a first rotor shaft bearing 89 and a second rotor shaft bearing 90 allowing relative rotation to the housings and stator 82. Electric motor 22 is commanded by controller 30. An input shaft 58 is provided which passes through hollow rotor shaft 86 and is coupled to the output of transmission 14 on a first end 88, therefore electric motor 22 is positioned to be concentric or coaxial with input shaft 58. Input shaft 58 is able to rotate freely within rotor shaft 86 as an input bearing 91 provides support on the first end 88 and a support bearing 92, between the input shaft 58 and rear output shaft 42, provides support on a second end 94. Front housing 78 is further used to support front output shaft 56 via front output bearing 96. Middle housing 76 also provides support for the rear portion of rotor shaft 86 via second rotor shaft bearing 90 and a forward portion of layshaft assembly 98 via bearing 95. Rear housing 80 is fastened to middle housing 76, enclosing power transferring device 66, layshaft assembly 98, and controllable clutch assembly 62. Support is provided by rear housing 80 to rear output shaft 42 via rear output bearing 100, to layshaft assembly 98 via bearing 102, and front output shaft 56 via bearing 104.

Figure 3:
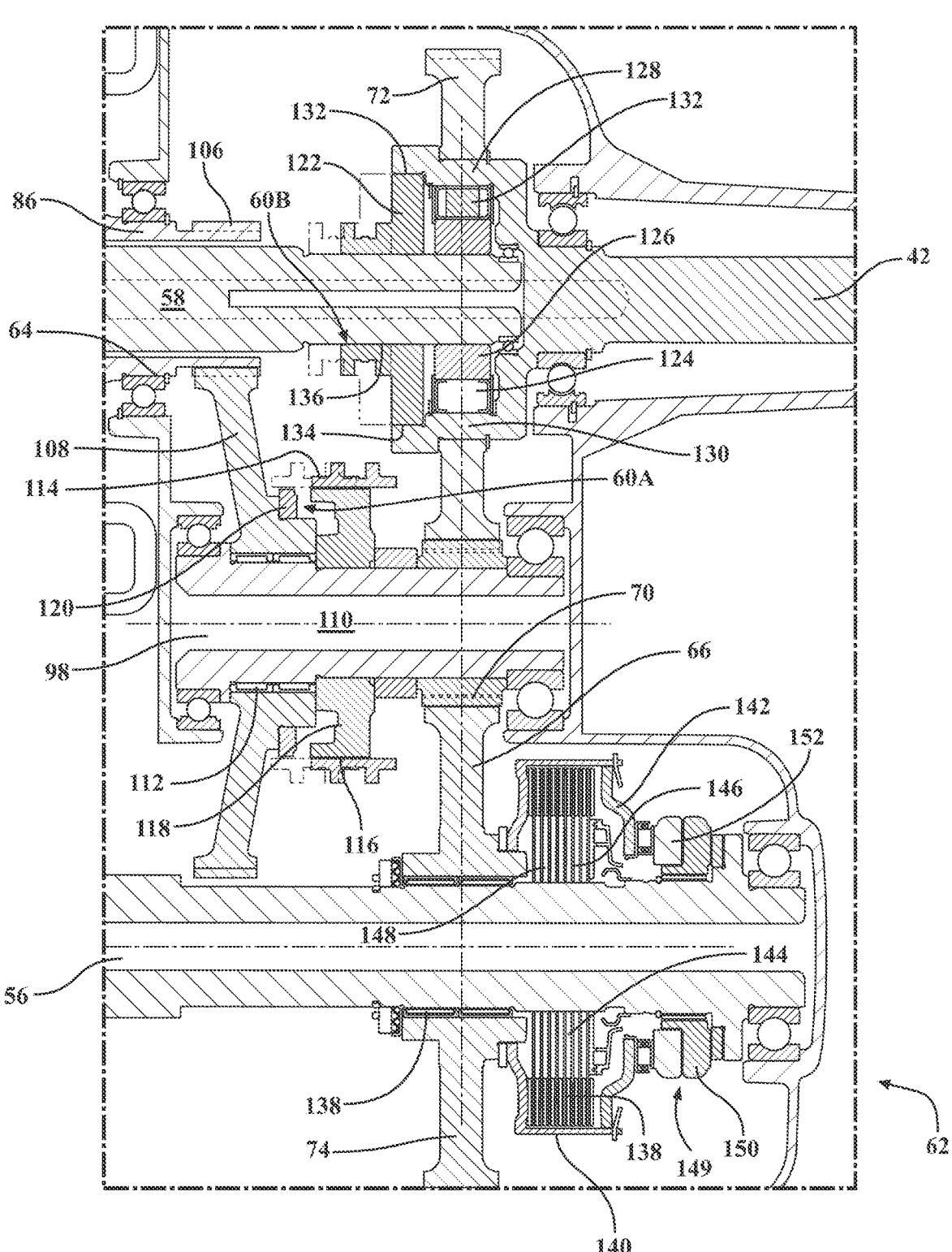
FIG. 3 is a detailed view of the mode selection device and power transfer device of the first embodiment of an electrified transfer case.

Now referring to FIG. 3, a detailed view of mode selection devices 60A and 60B as well as gear reduction 64 and power transfer device 66 of the first embodiment is provided. Power from electric motor 22 is delivered to the layshaft gear assembly 98 via a gear reduction 64 provided by an integrally formed layshaft input gear 106 on rotor shaft 86 meshed with layshaft gear 108. Layshaft gear 108 is supported and free to rotate about layshaft 110 via bearing 112 when not engaged by layshaft shift sleeve 114.

Layshaft mode selector 60A utilizes a layshaft shift sleeve 114, also referred to as a first shift sleeve, which is slidable on spline connection 116 on the outer portion of hub 118. Hub 118 is fixed to layshaft 110. Engagement teeth 120 integral to layshaft gear 108 are used to engage with mating features of layshaft shift sleeve 114. Layshaft shift sleeve 114 selectively moves axially to different positions based on the movement of actuator 68, including a first position with no engagement to layshaft gear 108 and a second position (towards the left in FIG. 3) engaging layshaft gear 108 via teeth 120. When layshaft gear 108 is selectively engaged with layshaft 110 via layshaft shift sleeve 114, this positive torque transferring connection transfers power from layshaft gear 108 to the layshaft 110 and idler gear 70, transferring torque from electric motor 22 to idler gear 70 multiplied by the ratio provided by gear reduction 64.

With continued reference to FIG. 3, power from engine 12 via transmission 14 and input shaft 58 may be selectively transferred to rear output shaft 42 based on the state of mainshaft mode selector 60B. Mainshaft mode selector 60B in this first embodiment includes a first selectable mainshaft shift sleeve 122 in conjunction with synchronization device located on the same axis as the input shaft 58 and rear output shaft 42. The synchronization device may utilize a one-way clutch 124, because it can be effectively used due to minimal amounts of drag and inertia that are reflected onto input shaft 58 from transmission 14 when in neutral. A one-way clutch 124 as provided is a passively actuated mechanical component which allows free rotation, or "freewheeling" between an inner ring portion and an outer ring portion in a first direction and a locking functionality in a second opposite direction. The direction and speeds of the inner ring relative to the outer ring will determine if locking elements engage the rings together or let the rings move relative to each other. The locking elements may be rollers, sprags, or struts which selectively engage into features formed into the inner or outer rings based on various design parameters.

The one-way clutch 124 is positioned between input shaft 58 and rear output shaft 42. Specifically, one-way clutch 124 includes an inner ring portion 126 coupled to the second end 86 of input shaft 58. Outer ring portion 128 is may be integrated into a bell shape portion 130 of rear output shaft 42, positioned radially within rear output gear 72. Locking elements 132 may be positioned radially between ring portions 126 and 128. In this embodiment, relative rotation of the input shaft 58 faster than rear output shaft 42 results in one-way clutch 124 being engaged. If input shaft 58 rotates slower than rear output shaft 42, one-way clutch will freewheel, resulting in no torque transfer. One-way clutch 124 may be used to synchronize the input shaft 58 relative to the rear output shaft 42 during mode changes, with the input shaft 58 and any coupled components of transmission 14 being brought up to speed and finally matched with the rear output shaft 42, with one-way clutch 124 fully locking once speeds match. Once one-way clutch 124 is locked, mainshaft shift sleeve 122 may be used to "lockout" one-way clutch 124 to allow connection in either rotational direction. This results in a condition where the inner ring 126 and outer ring 128 are fixed together for rotation independent of the speed and rotation relationship between input shaft 58 and rear output shaft 42. This is achieved by providing internal or external spline or face gear features 132 at the end or diameter of bell shape portion 130 to receive an arrangement of mating splines or face gear features 134 of mainshaft shift sleeve 122. Alternatively, a third sleeve may be actuated and used to connect mainshaft shift sleeve 122 to bell portion 130. Because mainshaft shift sleeve 122 is also connected to input shaft 58 via spline 136 in all axial positions, by moving mainshaft shift sleeve 122 (to the right in FIG. 3) into engagement with bell shaped portion 130 of rear output shaft 42 via teeth 132 and 134, power may be transferred between the input 58 and rear output 42 shafts independent of the operating state of one-way clutch 124.

Power provided to power transfer device 66, either via idler gear 70 or rear output gear 72 will drive front output gear 74 as each gear is meshed together. Front output gear 74 is coaxially arranged around front output shaft 56 and supported by gear support bearing 138, allowing front output gear 74 to rotate relative to front output shaft 56 unless controllable clutch assembly 62 is activated. Front output shaft 56 is supported for rotation relative to front housing 78 via bearing 96 and relative to rear housing 80 via front output rear bearing 104. Front output gear 74 is rotatably fixed to friction clutch assembly 138 of controllable clutch assembly 62. A controllable clutch assembly 62 is provided to actively control the power provided from front output gear 74 to front output shaft 56. Controllable clutch assembly 62, in this non-limiting example, includes a wet-type friction clutch assembly 138 disposed between front output gear 74 and front output shaft 56 for facilitating adaptive torque transfer therebetween.

Controllable clutch assembly 62 may be actuated by clutch actuation device 149. Friction clutch assembly 138 generally includes a first clutch member or clutch drum 140 fixed for common rotation with front output gear 74, a second clutch member or clutch hub 142 mounted to, or formed integrally with, an intermediate section of front output shaft 56, and a multi-plate clutch pack 144 having alternatively interleaved outer clutch plates 146 and inner clutch plates 148. Outer clutch plates 146 are splined for rotation with clutch drum 140 while inner clutch plates 148 are splined for rotation with clutch hub 142. Inner clutch plates 148 may alternatively be directly splined to front output shaft 56 with hub 142 eliminated. Controllable clutch assembly 62 is best shown, in the non-limiting example of FIG. 3, to include a motor-driven rotary-to-linear conversion device of the type commonly referred to as a ballramp unit. The ballramp unit generally includes a first cam ring 150, a second cam ring 152, and followers (not shown) disposed in aligned cam tracks formed therebetween. First cam ring 150 is non-rotatably fixed to housing 80 via an anti-rotation feature. An electric actuator is utilized, based on input from controller 30, to drive and rotate second cam ring 152 and, as a result of rotation of second cam ring 152 relative to first cam ring 150 a resultant axial travel and force is provided against friction clutch assembly 138. The electric actuator may be controlled to vary rotation, and therefore pressure on friction clutch assembly 138 and multiplate clutch 144, to vary the amount of torque transferred to front output shaft 56.

While controllable clutch assembly 62 is shown preferably configured as a multiplate wet-type friction clutch assembly 138 actuated by a ball ramp, those skilled in the art will recognize that such a mechanism is intended to represent any type of actively-controlled torque transfer clutch or coupling capable of selectively coupling front output shaft 56 for rotation with front output gear 74 for facilitating the transfer of drive torque to front driveline 18. Other rotary-to-linear conversion devices (i.e., ballscrew units), camming devices or pivotable devices configured to control the magnitude of the clutch engagement force applied to friction clutch assembly 138 are considered alternatives for controllable clutch assembly 62. Providing controllable clutch assembly 62 on the front output shaft 56 results in reduced axial packaging requirements of electrified transfer case 44.

FIGS. 4-7 provide a detailed illustration of how mode selector 60A and 60B are utilized in this electrified transfer case 44, using the layshaft gear reduction of the first embodiment. In particular, the operating condition of mainshaft shift sleeve 122 in conjunction with a one-way clutch 124 and layshaft shift sleeve 114 will be further described in relation to various operating modes and the transitions in between. Power flow through the electrified transfer case 44 is shown via bold lines and arrows and fully described for each mode including a traditional ICE driven mode, an electrical only mode, and a hybrid mode, along with 2WD or actively controlled 4WD functionality in each mode. A flat tow mode will also be described.

Figure 4:
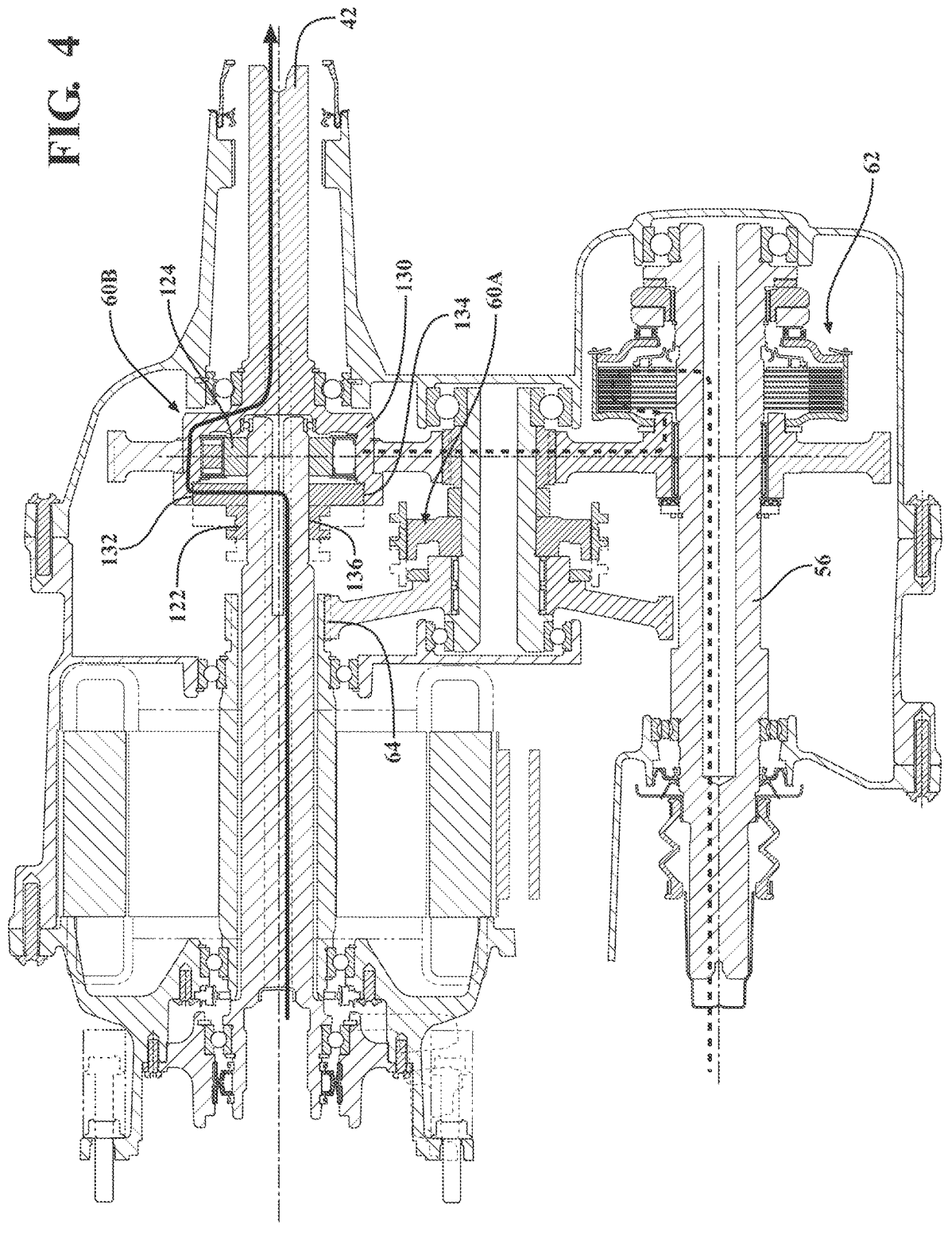
FIG. 4 is the power flow of a conventional mode, providing propulsion from the internal combustion engine.

FIG. 4 provides a conventional operating mode of the electrified transfer case 44 of the first embodiment, where only internal combustion engine 12 provides the source of propulsion for hybrid powertrain system 5. This mode may also be utilized when the vehicle is parked. Layshaft mode selection device 60A is in a disengaged state to prevent backdriving of electric motor 22. Mainshaft mode selection device 60B is in an engaged state, with mainshaft shift sleeve 122 moved towards the bell shaped portion 130 of rear output shaft 42, where teeth 132 and 134 are engaged, locking out one-way clutch 124. Input shaft 58, connected to the internal combustion engine 12 via transmission 14, transmits power into electrified transfer case 44 due to the engagement between input shaft 58 and mainshaft shift sleeve 122 via spline 136, and further between mainshaft shift sleeve 122 and rear output shaft 42 via engagement features 132 and 134. Additionally, based on the operational state of controllable clutch assembly 62, the power provided by engine 12 may be distributed fully to rear output shaft 42 and rear axle 34 to provide a 2WD mode or, with a variable force applied by clutch actuation device 149 to frictional clutch 62, torque may also be controllably distributed to the front output shaft 56 and front axle 48, providing an all-wheel or four wheel drive operating condition operating condition.

Figure 5:
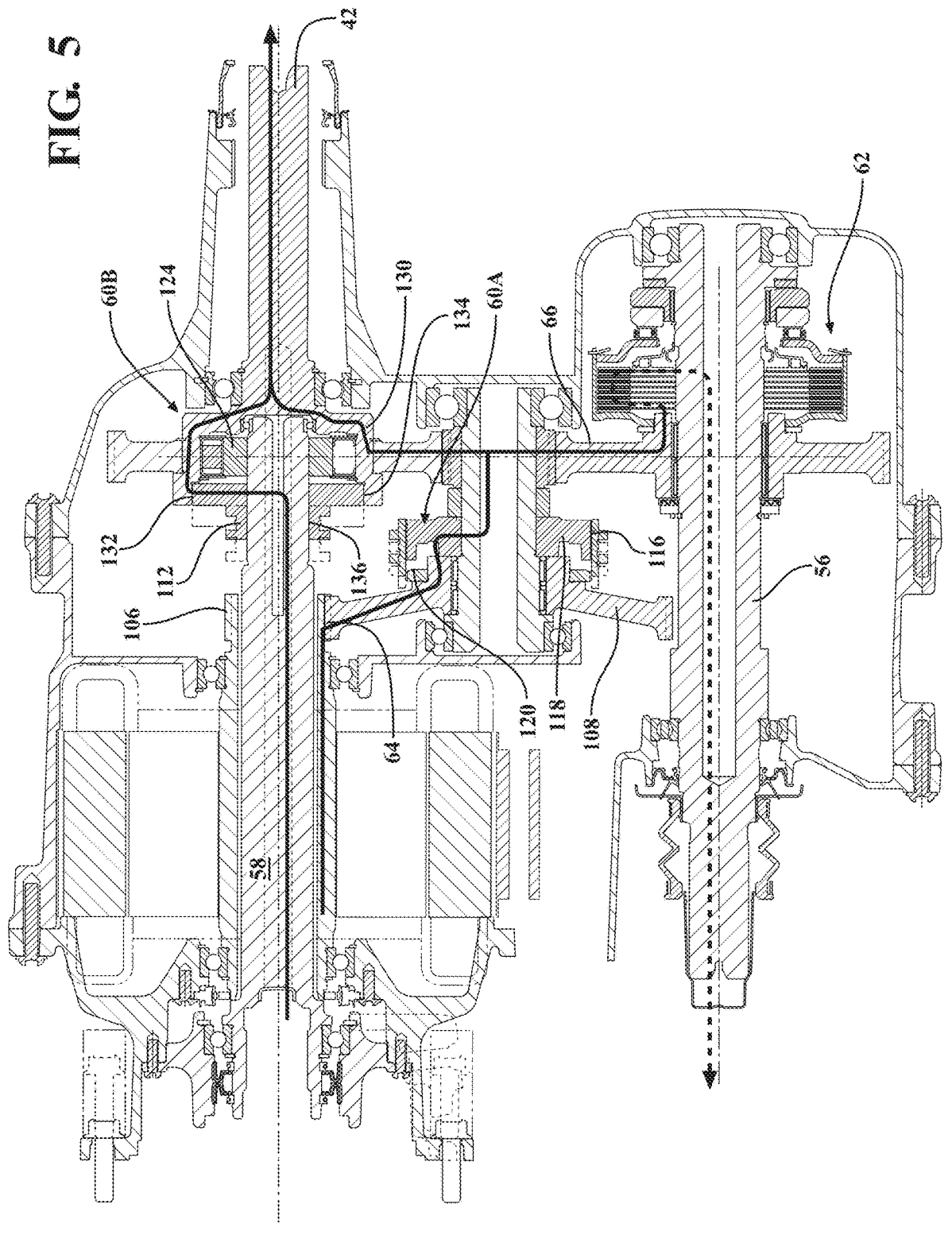
FIG. 5 is the power flow of a hybrid mode, providing propulsion from an electric motor and the internal combustion engine.

With reference to FIG. 5, a hybrid mode operation of the electrified transfer case 44 of the first embodiment, where electric motor 22 and internal combustion engine 12 both provide the source of propulsion for hybrid powertrain system 5, will now be described. Both layshaft mode selection device 60A and mainshaft mode selection device 60B are moved to the engaged state in this mode. Input shaft 58 connected to the internal combustion engine 12 transmits power into electrified transfer case 44 as described in the previous ICE mode. Electric motor 22, as controlled to boost overall power for hybrid powertrain system 5 by controller 30, drives gear reduction 64 via the constant meshed connection of layshaft input gear 106 to layshaft gear 108. Because mode selection device 60A is engaged in addition to device 60B being engaged, power is also transmitted from layshaft gear 108 to layshaft 110 and idler gear 70, via layshaft shift sleeve 114 being engaged to hub 118.

The increased electric motor 22 torque being transferred in this mode is combined with the power provided by internal combustion engine 12 via the meshed gears of power transfer device 66. Based on the operational state of controllable clutch assembly 62, the power provided by electric motor 22 and engine 12 may be distributed fully to rear output shaft 42 and rear axle 34 to provide a 2WD hybrid mode or, with a variable force applied by clutch actuation device 149 to frictional clutch 62, torque may also be controllably distributed to the front output shaft 56 and front axle 48, providing an all-wheel or four wheel drive operating condition in hybrid operating condition. In this hybrid mode, electric motor 22 may be back driven by hybrid powertrain system 5 during braking events, generating power back to battery 26. When transitioning from an engine only ICE mode to hybrid mode, the speed of electric motor 22 may be controlled by controller 30 to ensure the rotating speeds of layshaft gear 108 and layshaft shift sleeve 114 are closely matched, to ease the connection of the components via engagement teeth 120.

Figure 6:
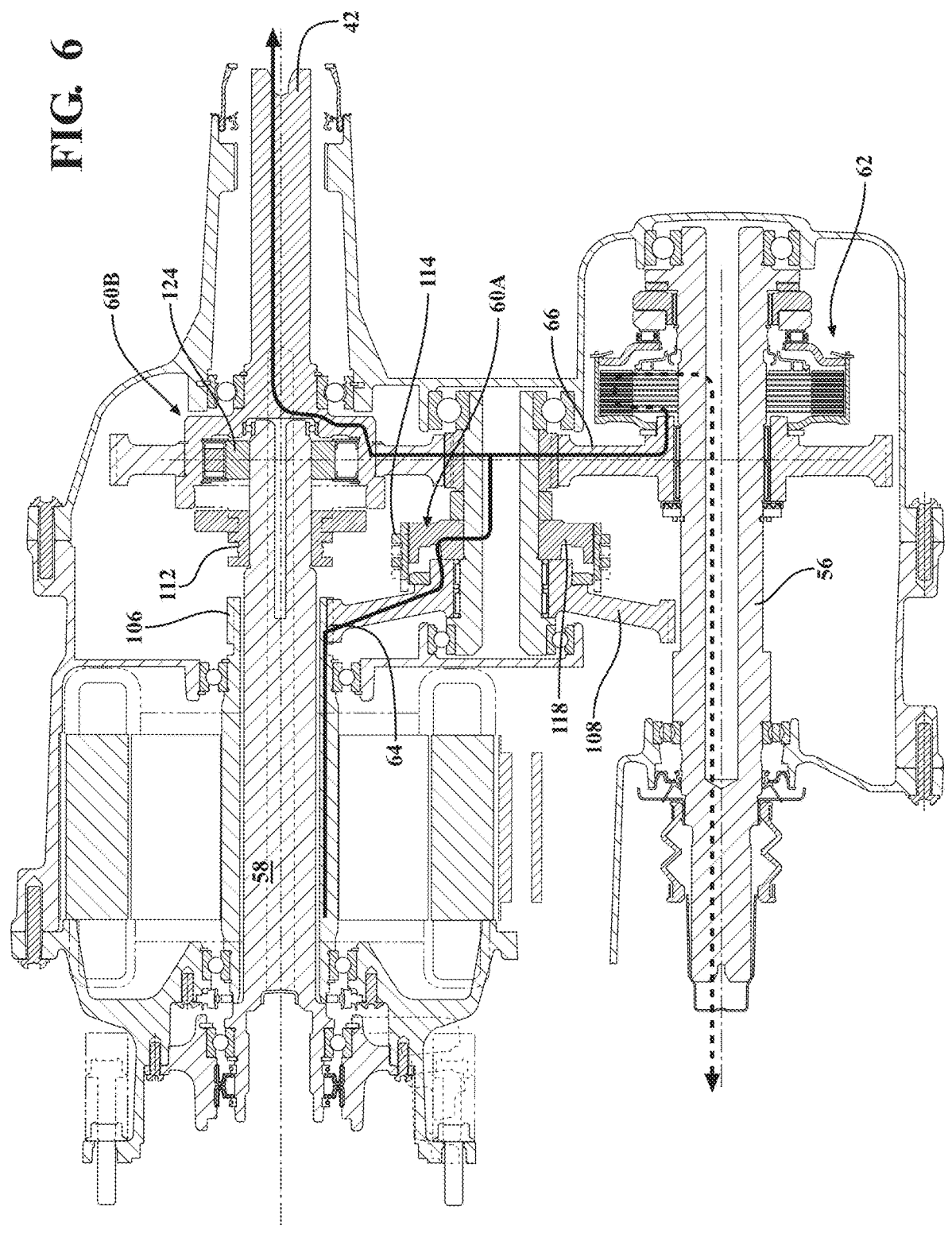
FIG. 6 is the power flow of an electric mode, providing propulsion from an electric motor.

With reference now to FIG. 6, an EV mode of operation of the electrified transfer case 44 of the first embodiment, where electric motor 22 provides the sole source of propulsion for hybrid powertrain system 5, will now be discussed in greater detail. In this operational mode, the mode selection device 60A is engaged. Mode selection device 60B is disengaged when in this EV mode. Input shaft 58, connected to the internal combustion engine 12 via transmission 14, does not transmit power into electrified transfer case 44, because there is no engagement of mainshaft shift sleeve 122 to rear output shaft 42, and transmission 14 moves to a neutral operating condition once sufficient power is provided by electric motor 22. Because transmission 14 is in neutral, input shaft 58 is not rotating. This condition results in the one-way clutch 124 being unlocked and operating in a freewheeling condition. This freewheeling condition is present because rear output shaft 42, and outer ring 128 of one-way clutch 124, will overrun inner ring 126 that is fixed to input shaft 58 once mainshaft shift sleeve 122 is fully disengaged.

Controller 30 will drive electric motor 22, in turn driving gear reduction 64 via the constant meshed connection of layshaft input gear 106 with layshaft gear 108. Because mode selection device 60A is engaged, power is transferred from layshaft gear 108 to layshaft 110 and idler gear 70 via layshaft shift sleeve 114 being engaged to hub 118. Based on the operational state of controllable clutch assembly 62, the power provided by electric motor 22 may be distributed fully to rear output shaft 42 and rear axle 34 to provide a 2WD EV mode or with a variable force applied by clutch actuation device 149 to frictional clutch 62 torque may also be controllably distributed to the front output shaft 56 and front axle 48 providing an all-wheel or four-wheel drive operating condition in EV. In this EV mode, electric motor 22 may be back driven by hybrid powertrain system 5 during braking events generating power back to battery 26. As electrified transfer case 44 transitions from EV mode back to hybrid mode to ensure smooth engagement of mainshaft shift sleeve 122 to rear output shaft 42, one-way clutch 124 is used to synchronize the input shaft 58 relative to the bell-shaped portion 130 of rear output shaft 42 during this mode change, with the input shaft 58 and any coupled components of transmission 14 being brought up to speed, overcoming drag and component inertial effects, with one-way clutch 124 fully locking once speeds are matched. Once one-way clutch 124 is locked, mainshaft shift sleeve 122 may be used to "lockout" one-way clutch 124 to allow connection in either of the rotational directions, and the shift to hybrid mode is completed.

Figure 7:
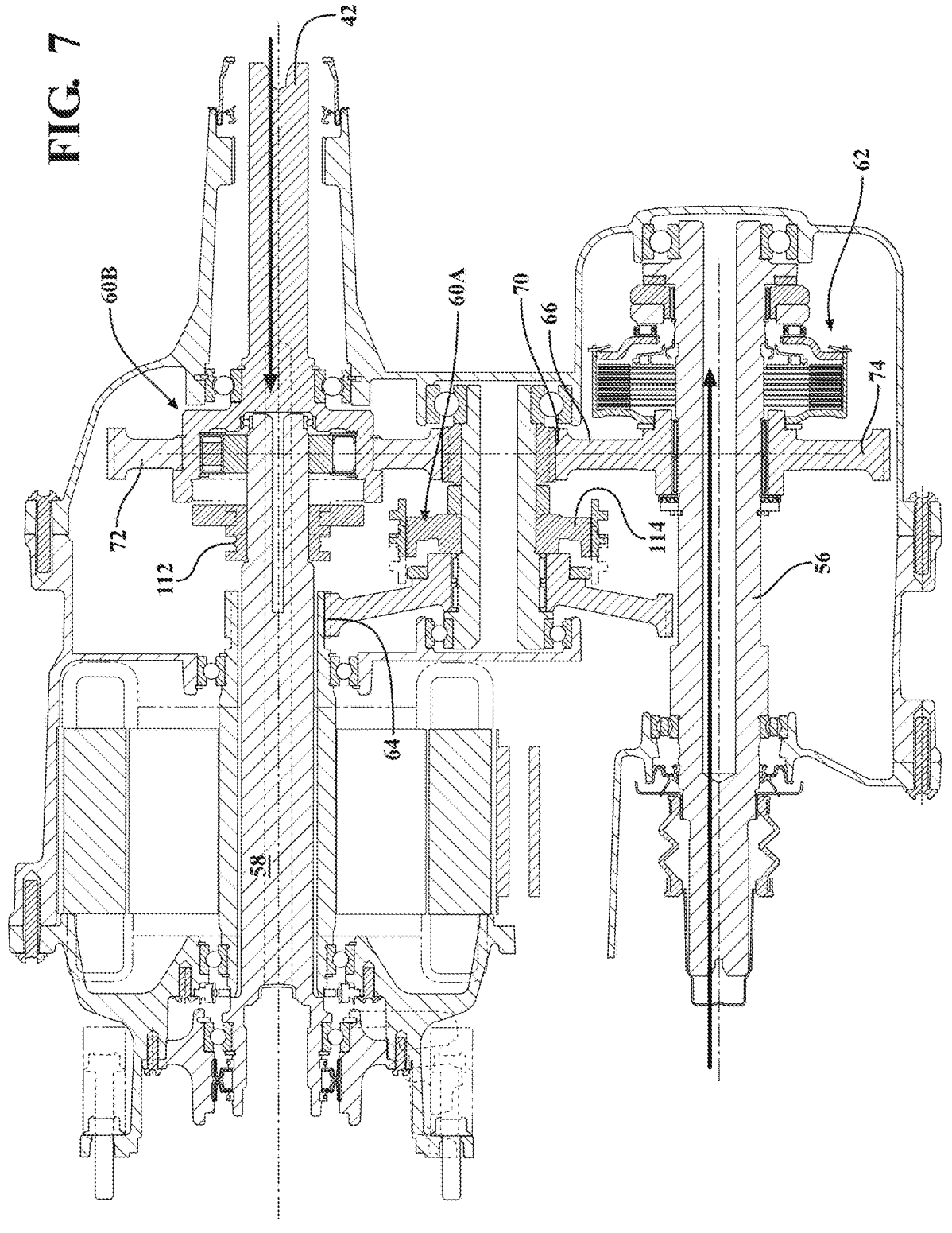
FIG. 7 is the power flow of a flat tow neutral mode of the first embodiment of an electrified transfer case.

FIG. 7 provides a flat tow operating mode providing a neutral mode of electrified transfer case 44, where mode selection device 60A and mode selection device 60B are both disengaged. Controllable clutch assembly 62 is open and not actuated in this mode. In this mode, the intention is to ensure rear driveline 16 and front driveline 18 do not backdrive transmission 14 (via input shaft 58) or electric motor 22 (via gear reduction 64). Rear output gear 72 is backdriven by rear driveline 16, resulting in idler gear 70 and front output gear 74 rotating, but because no positive connection is provided by either mainshaft shift sleeve 122, one-way clutch 124, or layshaft shift sleeve 114, no back-driving occurs when the vehicle is towed in the forward condition. If the vehicle is towed in a reverse direction, one-way clutch 124 will engage due to the rear output shaft 42 no longer overrunning input shaft 58. This will result in engagement of input shaft 58, backdriving input shaft 58, and transmission 44, but because this is a limited case no functional issues arise. Providing a flat tow neutral mode may provide alternatives to the types of motor 22 technology used during flat tow situations, because the concern for back EMF is eliminated.

Figure 8:
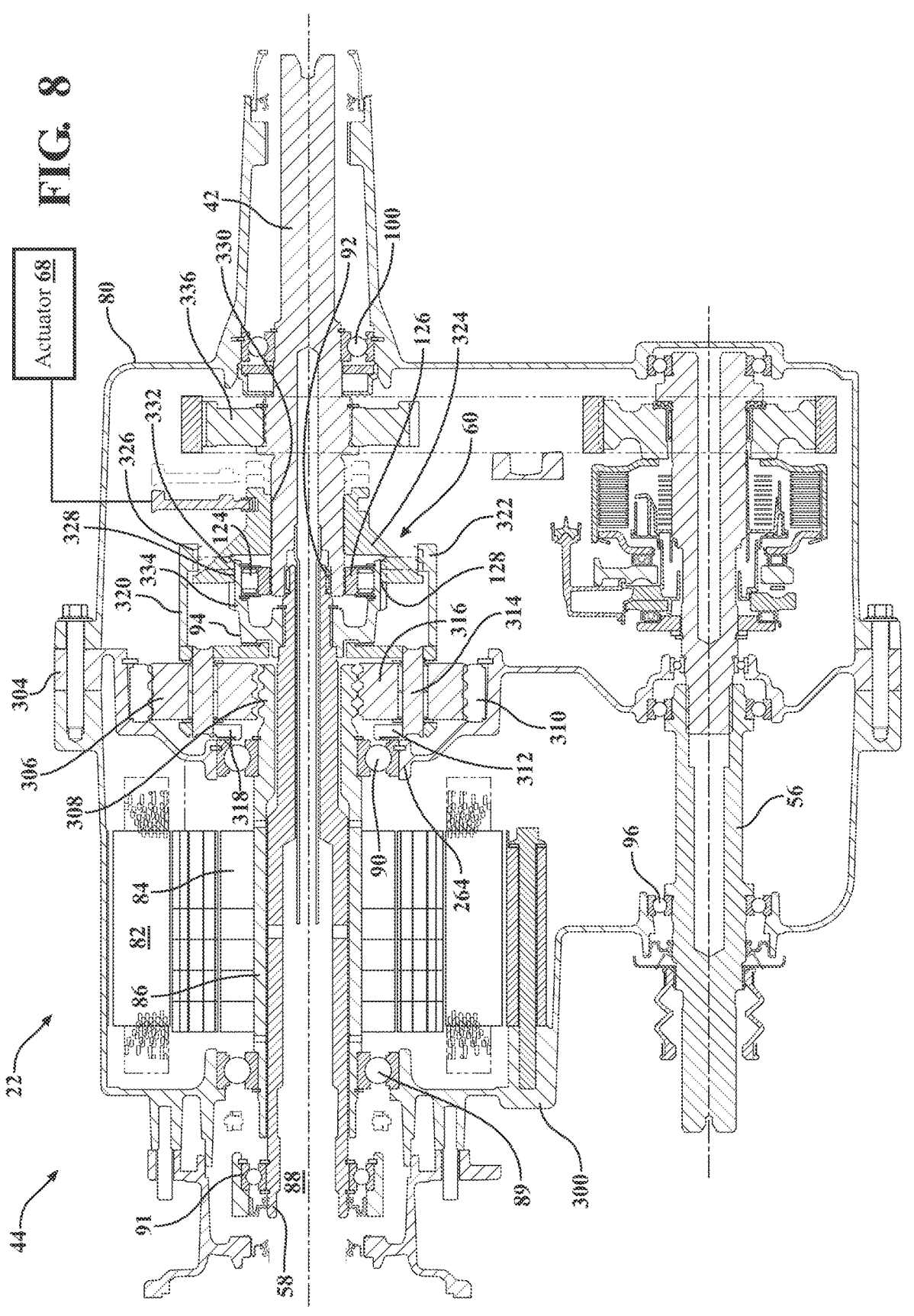
FIG. 8 is a cross section of a second embodiment of an electrified transfer case of the present disclosure.

Referring now to FIG. 8, a second arrangement of electrified transfer case 244 is shown. When design or functionality of the component or subsystem is similar to the first embodiment, figure numbering will be shared. Electrified transfer case 244 of the second arrangement includes an electric motor 22, a gear reduction assembly 264, in the form of a planetary arrangement, multiplying torque from electric motor 22 and delivering the torque, at times also including power provided from transmission 14 and input shaft 58, to a power transferring device 266 based on the state of a mode selector 60. The single mode selector 60 in this second arrangement is located on the same axis as the input shaft 58 and rear output shaft 42. Mode selector 60 may be shifted via an actuator 68 of electromechanical, electromagnetic or other type, capable of moving mode selectors 60 in a controlled manner through the various axial positions based on commands from controller 38. As in the previous embodiment, a synchronization device located on the same axis as the input shaft 58 and rear output shaft 58 is utilized within mode selector 60. The synchronization device may again utilize a one-way clutch 124 because it can be effectively used to overcome the minimal amounts of drag and inertia which are reflected onto input shaft 58 from transmission 14 when in neutral. Based on the mode selected, power is selectively provided to rear output shaft 42 and further distributed to front output shaft 56 via power transferring device 266 in the form of a chain. Alternatively, a gearset may be used in place of a chain. Controllable clutch assembly 62 further selectively controls the power split between front output shaft 56 and rear output shaft 42.

Electrified transfer case 244 includes a primary front housing 300 which receives an electric motor 22. A front cover 302 is provided to seal a portion of primary housing 300 around input shaft 58 on the front side. A midplate 304 is located between the primary front housing 300 and a rear housing 80. Rear housing 80 seals against the rear side of midplate 304. Electric motor 22 includes a stator 82 fixed to the primary housing 300. A rotor assembly 84 of the electric motor 22 is located radially inward from stator 82 and includes a hollow rotor shaft 86. Rotor shaft 86 is supported via a first rotor shaft bearing 89 and a second rotor shaft bearing 90, allowing rotation relative to housings 300 and 304 and stator 82. Electric motor 22 is commanded by controller 30. An input shaft 58 is provided, which passes through hollow rotor shaft 86 and is coupled to the output of transmission 14 on a first end 88, and therefore electric motor 22 is positioned to be concentric or coaxial with input shaft 58. Input shaft 58 is able to rotate freely within rotor shaft 86 because an input bearing 91 provides support via front cover 302 on the first end 88, and a support bearing 92 between the input shaft 58 and rear output shaft 42 provides support on a second end 94. Primary housing 300 is further used to support front output shaft 56 via front output bearing 96. Midplate 304 provides support for the rear portion of rotor shaft 86 via second rotor shaft bearing 90 and a planetary assembly 306. Rear housing 80 is fastened to midplate 304, enclosing power transferring device 266, planetary assembly 306, and controllable clutch assembly 62. Support is provided by rear housing 80 to rear output shaft 42 via rear output bearing 100 and rear portion of front output shaft 56 via bearing 104. Front output shaft 56 is shown as a two piece arrangement further supported by a bearing arrangement and midplate 304, but a single piece design may also be utilized.

Continuing to refer to FIG. 8, details of mode selection device 60 and gear reduction 264 and power transfer device 66 will be further described. The gear reduction 264 in this second embodiment is in the form of planetary assembly 306, located concentrically about the input shaft 58 axis. Planetary assembly 306 includes a sun gear 308 formed integrally on rotor shaft 86, a ring gear 310 rotatably fixed to midplate 304, a carrier unit 312 having a plurality of pins 314, and a plurality of planet gears 316 each rotatably mounted (via a bearing assembly) on a corresponding one of pins 314, and which are each in constant meshed engagement with sun gear 308 and ring gear 310, providing an increased ratio and multiplying the torque provided by electric motor 22. Carrier unit 312 includes a carrier body 318, which includes an extension 320, where a plurality of carrier clutching teeth 322 are provided on the inner surface. Mode selection device 60 includes an axially moveable shifting sleeve 324, which has four distinct operating positions, and which is moved axially via an actuator 68. Actuator 68 may be electromechanical, electromagnetic or other type of actuator capable of moving sleeve 324 in a controlled manner through the four distinct operating positions. Two sets of a plurality of clutching teeth 326 and 328 are provided on sleeve 324, along with a spline 330 on the inner bore that will engage to a similar spline feature on rear output shaft 42, allowing torque transfer from sleeve 324 into rear output shaft 42 in each position.

The first set of clutch teeth 326 are positioned on the radially outward surface to selectively engage with carrier clutching teeth 322 based on the position of shift sleeve 324. The second set of clutching teeth 328 are provided to engage with mating input clutching teeth 332 which are integral to a cup shaped component 334 that acts as the outer ring 128 for one-way clutch 124 and is fixed to the second end 94 of input shaft 58. Clutch teeth 332 may be formed on the outer diameter of cup shaped component 334 or in a face gear orientation on the side facing towards shifting sleeve 324. Operating conditions will be further described, but engagement by sleeve 324 may occur to carrier unit 312 and input shaft 58 independently, together, or with no connection based on the axial position of sleeve 324.

When shifting sleeve 324 is engaged to carrier unit 312 via teeth 322 and 326, torque from electric motor 22 is increased based on the ratio of planetary assembly 306 and delivered to rear output shaft 42 via spline 330. As utilized in the first embodiment, a one-way clutch 124 is located on the shared axis of input shaft 58 and rear output shaft 42. The one-way clutch 124 provided is a passively actuated mechanical component which allows free rotation, or "freewheeling" between an inner ring portion and an outer ring portion in a first direction and a locking functionality in a second opposite direction. Depending on the direction and speeds of the inner ring versus the outer ring will determine if locking elements engage the rings together or let the rings move relative to each other. The locking elements may be rollers, sprags, or struts which selectively engage into features formed into the inner or outer rings based on various design parameters. The one-way clutch 124 here is again positioned between input shaft 58 and rear output shaft 42, although with a change in orientation. In this embodiment, one-way clutch 124 includes an inner ring portion 126 coupled to the rear output shaft 42. Outer ring portion 128 is integrated into a cup shape portion 334 that is fixed to the second end 86 of input shaft 58. Locking elements 132, similar to the above, are positioned between ring portions 126 and 128. In this embodiment, operating conditions are similar, where rotation of the input shaft 58 faster than rear output shaft 42 will result in one-way clutch 124 engaging. If input shaft 58 rotates slower than rear output shaft 42, one-way clutch will freewheel resulting in no torque transfer. One-way clutch 124 may be used to synchronize the input shaft 58 relative to the rear output shaft 42 during mode changes, with input shaft 58 and any coupled components of transmission 14 being brought up to speed and finally matched with one-way clutch 124 fully locking once speeds match. Once one-way clutch 124 is locked, shift sleeve 324 may be used to "lockout" one-way clutch 124 to allow connection in either rotational direction. This "lockout" results in a condition where the inner ring 126 and outer ring 128 are fixed together for rotation independent of the speed and rotation relationship between input shaft 58 and rear output shaft 42. This is achieved by engaging the second set of clutching teeth 328 of sleeve 324 into input clutching teeth 332 based on the axial position of the shift sleeve 324. Because shift sleeve 324 is connected to rear output shaft 42 via spline 330 in all axial positions, moving shift sleeve 324 towards the left in FIG. 8 and into engagement with cup shaped portion 334 fixed to input shaft 58, power is transferred between the input 58 and rear output 42 shafts independent of the operating state of one-way clutch 124 in certain modes as will be further described.

Power from engine 12 via transmission 14 and input shaft 58, as well as power provided by electric motor 22 via planetary 306, may be transmitted to rear output shaft 42 based on the state of mode selector 60 and more specifically the position of shifting sleeve 324 and operational condition of one-way clutch 124. In this embodiment, power transfer device 66 is in the form of a chain 334 often utilized in standard transfer cases. A drive sprocket 336 is fixed for rotation to rear output shaft 42. A driven sprocket 338 is provided about the axis of the front output shaft 56. Driven sprocket 338 is supported for rotation about front output shaft 56 via sprocket support bearing 138. Drive sprocket 336, via chain 334, causes driven sprocket 338 to rotate, and, based on the operating condition of controllable clutch assembly 62, power distribution may be controlled for front output shaft 56. Controllable clutch assembly 62 is similar as described in the first embodiment. One difference relative to the above-described embodiment is that clutch drum 128 is fixed for common rotation with driven sprocket 338, rather than front output gear 74. The remaining configuration and operational conditions remain the same.

FIGS. 9-12 provide an illustration of how the mode selector 60 is utilized in this electrified transfer case 244, using the planetary gear reduction 306 of the second embodiment. In particular, the operating condition of shift sleeve 324, in conjunction with a one-way clutch 124 and carrier unit 312, will be further described in relation to various operating modes and the transitions therebetween. Power flow through the electrified transfer case 244 is shown via bold lines and arrows and fully described for each mode, including a traditional ICE driven mode, an electrical only mode, and a hybrid mode, along with 2WD or actively controlled 4WD functionality in each mode. A flat tow mode will also be described.

Figure 9:
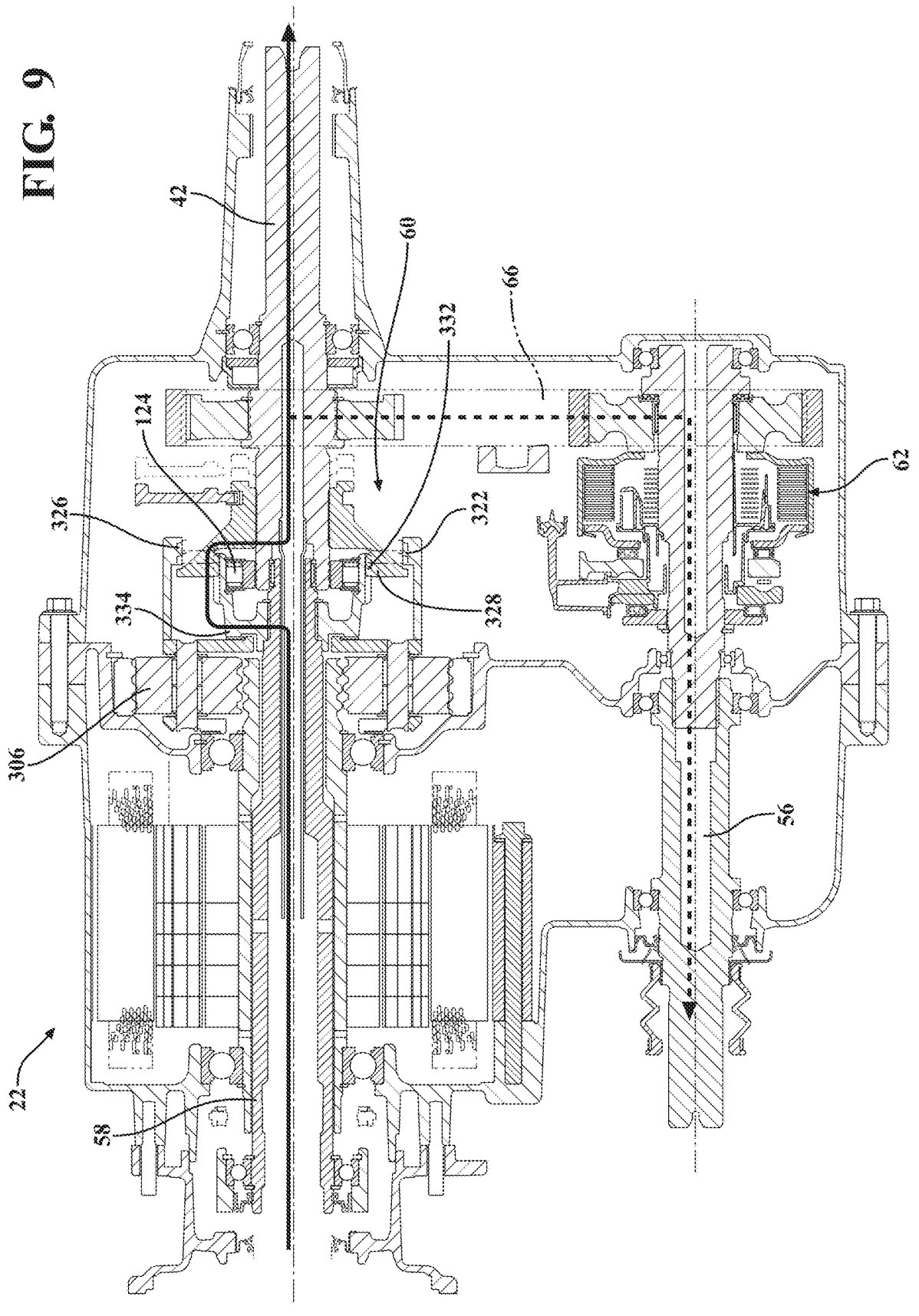
FIG. 9 is the power flow of the second embodiment of an electrified transfer case in a conventional mode, providing propulsion from the internal combustion engine.

FIG. 9 provides a conventional operating mode of the electrified transfer case 244 of the second embodiment, where internal combustion engine 12 provides the source of propulsion for hybrid powertrain system 5. Mode selection device 60 positions shift sleeve 324 in a first position, fully to the left in FIG. 9, towards input shaft 58, where connection is made to cup shaped component 324 and teeth 332, via teeth 328 of sleeve 324. In this position, carrier unit 312, and therefore planetary assembly 306, is not engaged to prevent backdriving of electric motor 22. Because a positive connection is made between input shaft 58 and rear output 42 with shift sleeve 324, one-way clutch 124 is "locked out." Input shaft 58, connected to the internal combustion engine 12 via transmission 14, transmits power into electrified transfer case 244 due to the engagement between input shaft 58 and shift sleeve 324 via teeth 328 and 332, and further between shift sleeve 324 and rear output shaft 42 via spline 330. Based on the operational state of controllable clutch assembly 62, the power provided by engine 12 may be distributed fully to rear output shaft 42 and rear axle 34 to provide a 2WD mode or, with a variable force applied by clutch actuation device 149 to frictional clutch 62, torque may also be controllably distributed to the front output shaft 56 and front axle 48, providing an all-wheel or four wheel drive operating condition operating condition.

Figure 10:
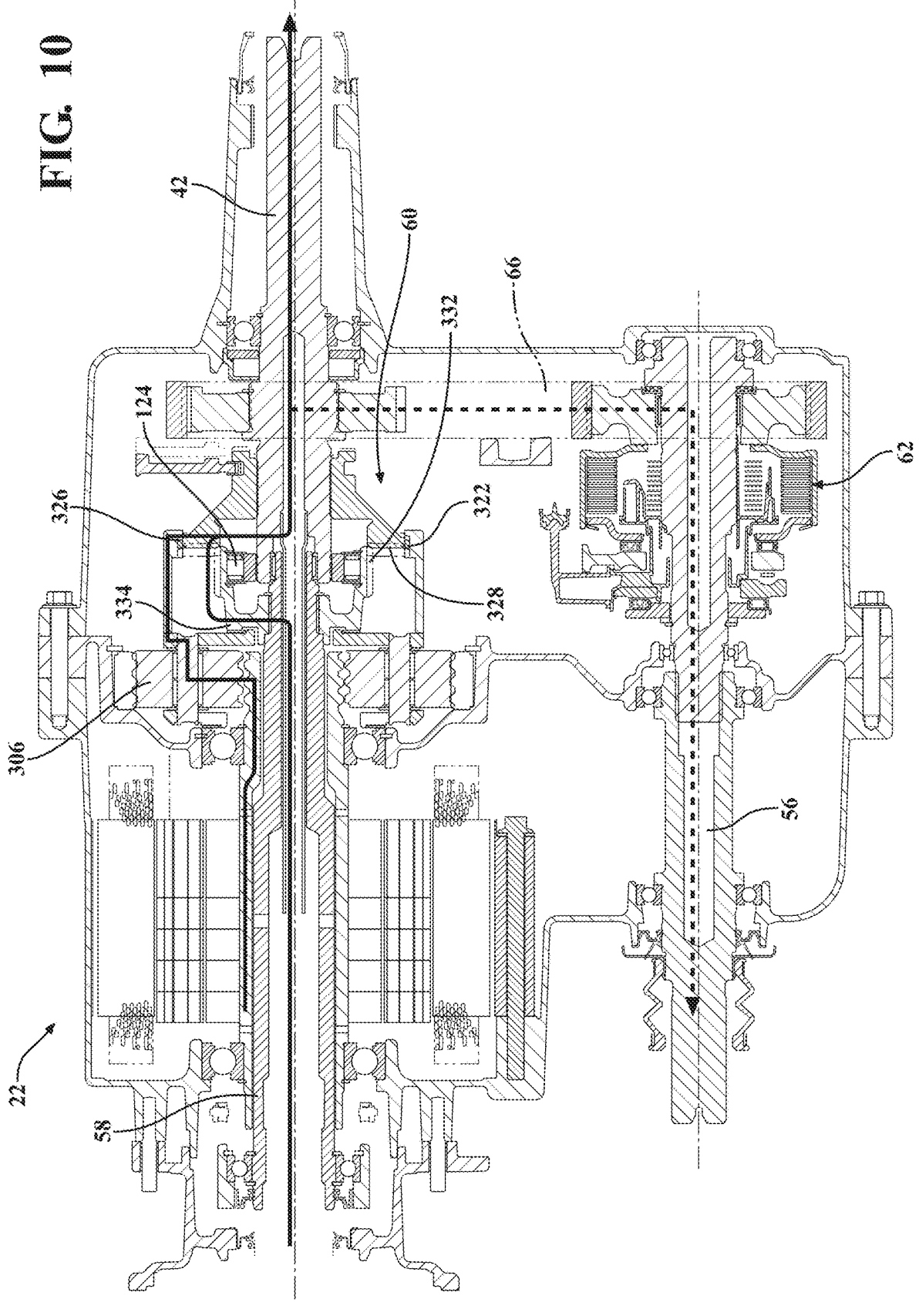
FIG. 10 is the power flow of the second embodiment of an electrified transfer case in a hybrid mode, providing propulsion from an electric motor and the internal combustion engine.

With reference to FIG. 10, a hybrid mode operation of the electrified transfer case 244 of the second embodiment, where electric motor 22 and internal combustion engine 12 will provide the source of propulsion for hybrid powertrain system 5, will now be described. Mode selection device 60 moves shift sleeve 324 one operating position towards the right in FIG. 10. Input shaft 58 connected to the internal combustion engine 12 transmits power into electrified transfer case 44 as described in the previous ICE mode. Electric motor 22, as controlled to boost overall power for hybrid powertrain system 5 by controller 30, drives planetary assembly 306. Because shift sleeve 324 is now engaged with both the carrier unit 312 via teeth 322 and 326 as well as with teeth 328 and 322, power is transferred into shift sleeve 324 along two paths and distributed to rear output shaft 42 via the spline connection 330. The increased electric motor 22 torque is combined with the power provided by internal combustion engine 12. Based on the operational state of controllable clutch assembly 62, the power provided by electric motor 22 and engine 12 may be distributed fully to rear output shaft 42 and rear axle 34 to provide a 2WD hybrid mode or, with a variable force applied by clutch actuation device 149 to frictional clutch 62, torque may also be controllably distributed to the front output shaft 56 and front axle 48, providing an all-wheel or four wheel drive operating condition in hybrid operating condition. In this hybrid mode, electric motor 22 may be back driven by hybrid powertrain system 5 during braking events generating power back to battery 26. When transitioning from an engine only ICE mode to hybrid mode, the speed of electric motor 22 may be controlled by controller 30 to ensure the rotating speeds of carrier unit 312 are closely matched to the rotating speed of shift sleeve 324, to ease the connection of the components via engagement teeth 322 and 326.

Figure 11:
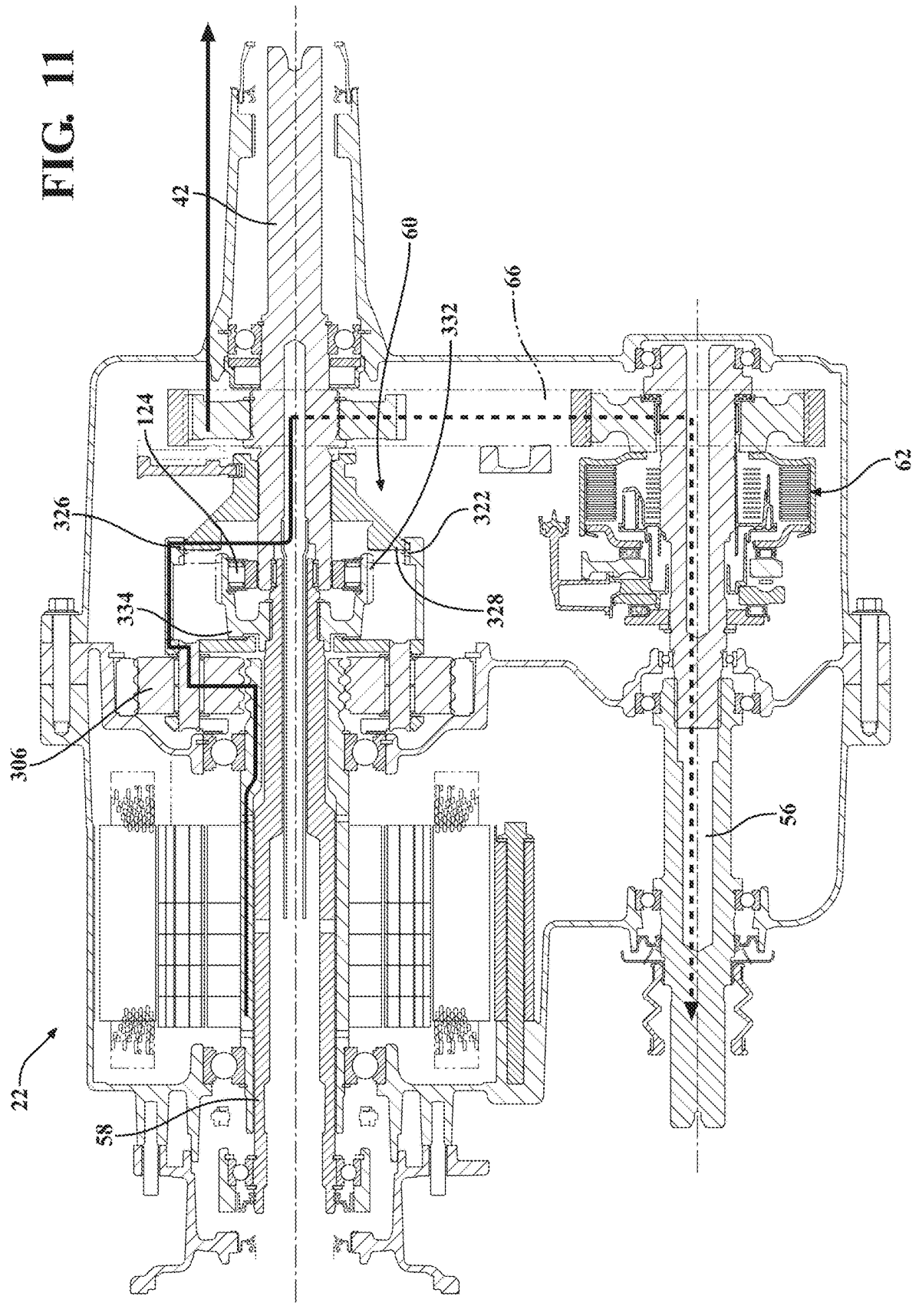
FIG. 11 is the power flow of the second embodiment of an electrified transfer case in an electric mode, providing propulsion from an electric motor.

With reference to FIG. 11, an EV mode of operation of the electrified transfer case 244 of the second embodiment, where electric motor 22 provides the sole source of propulsion for hybrid powertrain system 5, will now be discussed in greater detail. In this operational mode, mode selection device 60 moves shifting sleeve 324 further to the right in FIG. 11. This movement maintains engagement between the carrier unit 312 and shifting sleeve 324, as in hybrid mode, but disconnects teeth 328 and 332, thereby resulting in cup 334 and input shaft 58 being free of constraints from shifting sleeve 324, allowing input shaft 58 to operate relative to rear output shaft 42. Input shaft 58, connected to the internal combustion engine 12 via transmission 14, will not transmit power into electrified transfer case 44, and transmission 14 will move to a neutral operating condition once sufficient power is provided by electric motor 22. Because transmission 14 is in neutral, input shaft 58 will not be rotating. This arrangement results in the one-way clutch 124 being unlocked and operating in a freewheeling condition. This is because rear output shaft 42, and outer ring 128 of one-way clutch 124, will overrun inner ring 126 fixed to input shaft 58 once shift sleeve 324 is fully disengaged. Controller 30 drives electric motor 22, which in turn drives planetary assembly 306 and delivers power to the rear output shaft 42 via shifting sleeve 324.

Based on the operational state of controllable clutch assembly 62, the power provided by electric motor 22 may be distributed fully to rear output shaft 42 and rear axle 34 to provide a 2WD EV mode or, with a variable force applied by clutch actuation device 149 to frictional clutch 62, may provide an all-wheel or four-wheel drive operating condition in EV. In this EV mode, electric motor 22 may be back driven by hybrid powertrain system 5 during braking events generating power back to battery 26. As electrified transfer case 244 transitions from EV mode back to hybrid mode, to ensure smooth engagement of shift sleeve 324 to rear output shaft 42, one-way clutch 124 will be used to synchronize the rear output shaft 42 and input shaft 58 during this mode change, with the by bringing input shaft 58 and any coupled components of transmission 14 being brought up to speed, overcoming drag and component inertial effects, with one-way clutch 124 fully locking once speeds are matched. Once one-way clutch 124 is locked, shift sleeve 324 may be used to "lockout" one-way clutch 124 to allow connection in either of the rotational directions, and the shift back to hybrid mode is completed.

Figure 12:
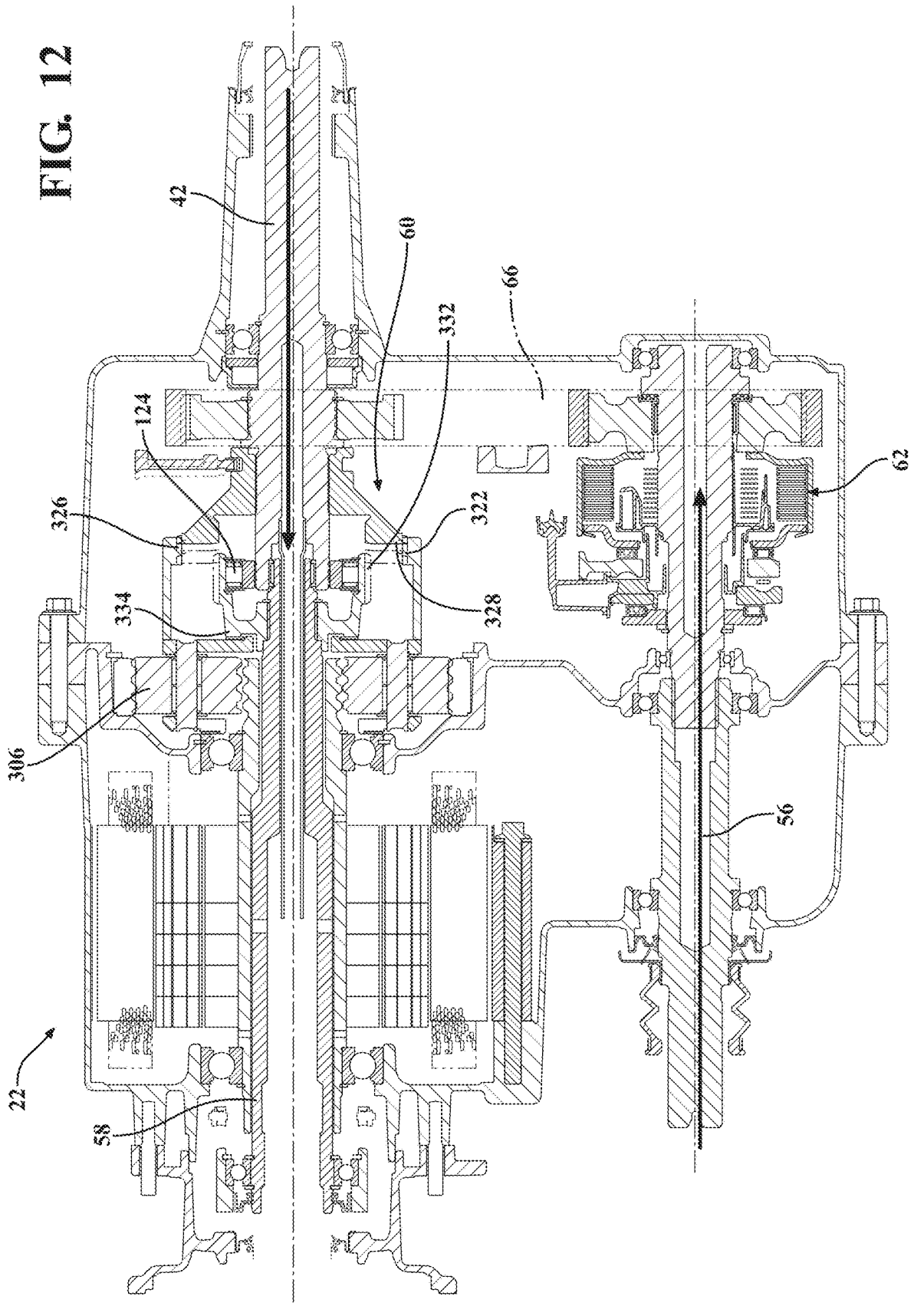
FIG. 12 is the power flow of a flat tow neutral mode of the second embodiment of an electrified transfer case.

FIG. 12 illustrates a flat tow operating mode, providing a neutral mode of electrified transfer case 44, where mode selection device 60 fully disengages shift sleeve 324 from both carrier unit 312 and the cup shaped portion 334 of input shaft 58. In this mode, controllable clutch assembly 62 remains fully open and is not actuated. In this mode, the intention is to ensure rear driveline 16 and front driveline 18 do not backdrive transmission 14 via input shaft 58 or electric motor 22 via planetary 306. Drive sprocket 336 will be backdriven by rear driveline 16, resulting in the chain 334 driving driven sprocket 338, but because no positive connection is provided by either shift sleeve 324 or one-way clutch 124, no backdriving occurs when the vehicle is towed in the forward condition. If the vehicle is towed in a reverse direction, one-way clutch 124 would engage due to the rear output shaft 42 no longer overrunning input shaft 58. This would result in engagement of input shaft 58, backdriving input shaft 58 and transmission 44, but as this is a limited case no functional issues would arise. Providing a flat tow neutral mode may provide alternatives to the types of motor 22 technology used during flat tow situations as the concern for back EMF is eliminated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. An electrified transfer case for a vehicle having an engine, a transmission, and front and rear drivelines, the transfer case comprising:

a first output shaft configured for connection to the rear driveline;

a second output shaft configured for connection to the front driveline;

an input shaft configured for connection to an output of the transmission;

an electric motor having a motor output;

a gear set driven by the motor output, wherein the gear set selectively provides torque multiplication from the motor output to the first output shaft;

a controllable multi-position connection system that selectively sets one of a plurality of torque transferring operation modes;

a controllable torque transfer system that selectively transfers torque between the first output shaft and the second output shaft; and a synchronization device operatively connected between the input shaft and the first output shaft;

wherein the synchronization device permits the first output shaft to overrun the input shaft;

wherein the input shaft will engage the first output shaft via the synchronization device when the first output shaft no longer overruns the input shaft;

wherein the multi-position connection system is operable to lock out the synchronization device, such that torque transfers between the first output shaft and the input shaft in both rotational directions.

2. The transfer case of claim 1, wherein the synchronization device synchronizes a rotational speed of both the input shaft and the first output shaft, such that the connection system is moveable into a positive connection engagement with both the input shaft and the first output shaft, wherein the positive connection links the rotational speed of the input shaft and the first output shaft in both rotational directions.

3. The transfer case of claim 1, wherein the synchronization device is a one-way clutch.

4. The transfer case of claim 1, wherein the gear set includes a layshaft and a layshaft gear in meshed engagement with an output gear of the electric motor, wherein the layshaft gear is rotatable relative to the layshaft, and is configured for being selectively rotatably fixed with the layshaft.

5. The transfer case of claim 4, wherein the multi-position connection system includes a main shaft shift sleeve coaxial with the input shaft and the first output shaft and a layshaft shift sleeve coaxial with the layshaft and the layshaft gear, wherein an axial position of the layshaft shift sleeve and the main shaft shift sleeve are controllably axially shiftable to define different torque transferring operating modes.

6. The transfer case of claim 5, wherein the main shaft shift sleeve is rotatably fixed to the input shaft and selectively shiftable into and out of engagement with the first output shaft, and wherein the layshaft shift sleeve is rotatably fixed to the layshaft and selectively shiftable into and out of engagement with the layshaft gear.

7. The transfer case of claim 1, wherein the gear set includes a planetary gear assembly having a carrier, a fixed ring gear, and a plurality of planet gears carried on the carrier, and a sun gear, wherein the planet gears are in meshed engagement with the fixed ring gear and the sun gear;

wherein the sun gear is fixed for rotation with the electric motor output;

wherein the carrier includes a body portion to which the planet gears are attached and an extension;

wherein the extension is selectively coupled for fixed rotation with the input shaft based on a position of the multi-position connection system.

8. An electrified transfer case for a vehicle having an engine, a transmission, and front and rear drivelines, the transfer case comprising:

a first output shaft configured for connection to the rear driveline;

a second output shaft configured for connection to the front driveline;

an input shaft configured for connection to an output of the transmission;

an electric motor having a motor output;

a gear set driven by the motor output, wherein the gear set selectively provides torque multiplication from the motor output to the first output shaft;

a controllable multi-position connection system that selectively sets one of a plurality of torque transferring operation modes;

a controllable torque transfer system that selectively transfers torque between the first output shaft and the second output shaft; and a synchronization device operatively connected between the input shaft and the first output shaft;

wherein the gear set includes a layshaft and a layshaft gear in meshed engagement with an output gear of the electric motor, wherein the layshaft gear is rotatable relative to the layshaft, and is configured for being selectively rotatably fixed with the layshaft;

wherein the multi-position connection system includes a main shaft shift sleeve coaxial with the input shaft and the first output shaft and a layshaft shift sleeve coaxial with the layshaft and the layshaft gear, wherein an axial position of the layshaft shift sleeve and the main shaft shift sleeve are controllably axially shiftable to define different torque transferring operating modes;

wherein the main shaft shift sleeve is rotatably fixed to the input shaft and selectively shiftable into and out of engagement with the first output shaft, and wherein the layshaft shift sleeve is rotatably fixed to the layshaft and selectively shiftable into and out of engagement with the layshaft gear;

wherein the layshaft includes an idler gear that rotates with the layshaft, wherein the idler gear is meshed with a front output gear and a rear output gear, wherein driven rotation of the layshaft transfers torque to both the front output gear and the rear output gear via the idler gear.

9. The transfer case of claim 8, wherein the controllable torque transfer system includes a controllable friction clutch disposed between the front output gear and the second output shaft, and wherein the rear output gear is fixed to the first output shaft, wherein when the clutch is engaged torque transfers between the front output gear and the rear output gear.

10. The transfer case of claim 9, wherein in a traditional operating mode, the main shaft shift sleeve is shifted into engagement with the first output shaft, and the layshaft shift sleeve is shifted out of engagement with the layshaft gear, such that the input shaft provides power at least to the first output shaft.

11. The transfer case of claim 10, wherein in a hybrid operating mode, the main shaft shift sleeve is shifted into engagement with the first output shaft, and the layshaft shift sleeve is shifted into engagement with the layshaft gear, wherein the input shaft and the electric motor both provide power to the first output shaft.

12. The transfer case of claim 11, wherein in an electric operating mode, the main shaft shift sleeve is shifted out of engagement with the first output shaft, and the layshaft shift sleeve is shifted into engagement with the layshaft, wherein the electric motor provides power to the first output shaft.

13. The transfer case of claim 12, wherein in a flat tow operating mode, the main shaft shift sleeve is shifted out of the engagement with the first output shaft, and the layshaft shift sleeve is shifted out of engagement with the layshaft gear, such that first and second output gears are rotatable in at least one rotatable direction without backdriving the input shaft or the electric motor.

14. An electrified transfer case for a vehicle having an engine, a transmission, and front and rear drivelines, the transfer case comprising:

a first output shaft configured for connection to the rear driveline;

a second output shaft configured for connection to the front driveline;

an input shaft configured for connection to an output of the transmission;

an electric motor having a motor output;

a gear set driven by the motor output, wherein the gear set selectively provides torque multiplication from the motor output to the first output shaft;

a controllable multi-position connection system that selectively sets one of a plurality of torque transferring operation modes;

a controllable torque transfer system that selectively transfers torque between the first output shaft and the second output shaft; and a synchronization device operatively connected between the input shaft and the first output shaft;

wherein the gear set includes a planetary gear assembly having a carrier, a fixed ring gear, and a plurality of planet gears carried on the carrier, and a sun gear, wherein the planet gears are in meshed engagement with the fixed ring gear and the sun gear;

wherein the sun gear is fixed for rotation with the electric motor output;

wherein the carrier includes a body portion to which the planet gears are attached and an extension;

wherein the extension is selectively coupled for fixed rotation with the input shaft based on a position of the multi-position connection system;

wherein the multi-position connection system includes a shift sleeve fixed for rotation with the first output shaft and shiftable into selective engagement with a cup portion fixed for rotation with the input shaft at a first axial position of the shift sleeve, both the cup portion and the extension of the carrier at a second axial position of the shift sleeve, the extension of the carrier at a third axial position of the shift sleeve, and neither the cup portion nor the extension at a fourth axial position of the shift sleeve.

15. The transfer case of claim 14, wherein the synchronization device is a one-way clutch disposed radially between the first output shaft and the cup portion, wherein an engaging portion of the shift sleeve is disposed radially between the cup portion and the extension.

16. The transfer case of claim 15, wherein the controllable torque transfer system transfers torque between a drive sprocket fixed to the first output shaft and a driven sprocket fixed to controllable friction clutch disposed between the driven sprocket and the second output shaft, wherein when the friction clutch is engaged torque transfers between the first output shaft and the second output shaft.

17. The transfer case of claim 14, wherein in the first axial position of the shift sleeve, the input shaft provides power to the first output shaft, wherein in the second axial position the input shaft and the electric motor provide power to the first output shaft, wherein in the third axial position the electric motor provides power to the first output shaft, wherein the in the fourth axial position, the input shaft and the electric motor are decoupled from the first and second output shafts, such that rotation of the first and second output shafts in at least one rotation direction will not backdrive the input shaft or the electric motor.

18. The transfer case of claim 14, wherein the synchronization device permits the first output shaft to overrun the input shaft.

19. The transfer case of claim 18, wherein the input shaft will engage the first output shaft via the synchronization device when the first output shaft no longer overruns the input shaft.

20. The transfer case of claim 19, wherein the multi-position connection system is operable to lock out the synchronization device, such that torque transfers between the first output shaft and the input shaft in both rotational directions.

* * * * *